(12) United States Patent
Meiffre (10) Patent No.: US 11,359,662 B2
(45) Date of Patent: Jun. 14, 2022

(54) POSITIVE LOCKING FASTENER (71) Applicant: LISI AEROSPACE, Paris (FR)

(72) Inventor: Loïc Meiffre, Conflans Sainte-Honorine (FR)

(73) Assignee: LISI AEROSPACE, Paris (FR)

( * ) Notice: Subject to any disclaimer, the term of this patent is extended or adjusted under 35 U.S.C. 154(b) by 378 days.

(21) Appl. No.: 16/622,940

(22) PCT Filed: Jun. 14, 2018

(86) PCT No.: PCT/FR2018/051417
§ 371 (c)(1),
(2) Date: Dec. 15, 2019

(87) PCT Pub. No.: WO2018/229446
PCT Pub. Date: Dec. 20, 2018

(65) Prior Publication Data
US 2020/0248737 A1 Aug. 6, 2020

(30) Foreign Application Priority Data
Jun. 15, 2017 (FR) ........................... 1755420

(51) Int. Cl.
*F16B 37/14* (2006.01)
*F16B 39/08* (2006.01)

(52) U.S. Cl.
CPC ............. *F16B 37/14* (2013.01); *F16B 39/08* (2013.01)

(58) Field of Classification Search
CPC .......... F16B 21/12; F16B 37/14; F16B 39/04; F16B 39/08; F16B 39/10; F16B 39/14;
(Continued)

(56) References Cited

U.S. PATENT DOCUMENTS 1,305,698 A * 6/1919 Day .................... F16B 39/10
411/933
2,365,433 A 12/1944 Polizzi
(Continued)

FOREIGN PATENT DOCUMENTS

EP 0576871 1/1994
EP 1496274 1/2005
(Continued)

OTHER PUBLICATIONS

Pöll, Andreas, International Search Report, Oct. 17, 2018, 3 pages, European Patent Office, P.B. 5818 Patentlaan 2, NL-2280 HV Rijswijk, Netherland.
(Continued)

*Primary Examiner* — Roberta S Delisle
(74) *Attorney, Agent, or Firm* — Henricks Slavin LLP (57) ABSTRACT

The invention relates to a positive locking fastener comprising: a screw (1), a threaded portion (11) of which has a blind hole (110) and a groove (111); a nut (2) having a tightening portion (21); a cap (3); and a pin (4). The cap (3) has an immobilizing portion (31) intended to engage with the tightening portion (21) and a locking portion (32) intended to cooperate with the blind hole (110) to prevent said cap from rotating relative to the screw (1). The locking portion (32) also comprises openings (322) suitable for allowing the pin (4) to be inserted into said openings and into the groove (111) in order to hold the screw (1) and the cap (3) together.

12 Claims, 6 Drawing Sheets (58) Field of Classification Search
CPC ........ F16B 39/34; F16B 39/36; Y10S 411/91; Y10S 411/924; Y10S 411/929
USPC ............. 411/190, 191, 259, 260, 315, 372.5, 411/372.6, 513
See application file for complete search history.

(56) References Cited

U.S. PATENT DOCUMENTS

| | | | |
|---|---|---|---|
| 3,548,704 A | 12/1970 | Kutryk | |
| 4,505,628 A * | 3/1985 | Meibuhr | F16B 39/10 411/315 |
| 5,360,303 A | 11/1994 | Behrens et al. | |
| 7,090,454 B2 * | 8/2006 | Shain | F16B 21/065 411/432 |
| 8,366,367 B2 * | 2/2013 | Matlock | F16B 37/14 411/429 |
| 2017/0102023 A1 | 4/2017 | Schepergerdes | |
| 2020/0149580 A1 * | 5/2020 | Abou Halima | F16B 39/08 |
| 2020/0248737 A1 * | 8/2020 | Meiffre | F16B 37/14 |
| 2021/0190125 A1 * | 6/2021 | Goyer | F16B 39/08 |

FOREIGN PATENT DOCUMENTS

| | | |
|---|---|---|
| EP | 2044342 | 9/2014 |
| EP | 3104027 | 12/2016 |
| FR | 615364 | 1/1927 |
| FR | 825722 | 3/1938 |
| FR | 1557874 | 2/1969 |
| JP | S5388657 | 7/1978 |
| JP | H01146009 | 10/1989 |
| JP | 3629486 | 3/2005 |

OTHER PUBLICATIONS

Pöll, Andreas, Written Opinion, Oct. 17, 2018, 6 pages, European Patent Office, D-80298 Munich, Germany.

* cited by examiner

POSITIVE LOCKING FASTENER

CROSS REFERENCE TO RELATED APPLICATIONS

This application is a National Stage of International Application No. PCT/FR2018/051417, filed Jun. 14, 2018, which claims priority from FR1755420 filed Jun. 15, 2017, the entire contents of which are incorporated herein by reference.

TECHNICAL FIELD

The invention belongs to the field of mechanical fasteners.

More particularly, the invention relates to the field of mechanical attachments with positive locking.

STATE OF THE ART

A problem raised by the fastening mode of a structural assembly by threaded fasteners is that of loosening in use, generally due to vibrations. Positive locking devices are provided to solve this problem.

It is known practice to use locking wires to avoid loosening of the fasteners by vibration. A disadvantage of such wires is that they do not sufficiently limit the release of the fasteners.

Japanese patent application JP 3629486 describes a positive locking fastener comprising a screw, a nut and a cap. The cap comprises a lower portion with a star-shaped polygonal cross-section having M apexes adapted to engage with the nut, and an upper portion adapted to engage with an engagement portion of the screw with a star-shaped polygonal cross-section having N apexes. An angular clearance provided between the lower part and the nut and an angular clearance provided between the upper part and the engagement part of the screw enable the cap to be engaged on the screw and the nut for a number of positions of the given cap by the largest common divisor of M and N. The sum of the angular clearances is given by a ratio between 180° and the smallest common multiple of M and N.

In order to limit the loosening of the fastener presented, it is necessary to have the smallest possible angular clearances, and therefore a smaller multiple of M and N as large as possible. As a result, this fastener is particularly suitable for screw/nut assemblies making it possible to obtain a larger common divisor as small as possible.

A drawback of this invention is therefore that the cap cannot engage both the screw and the nut from the first test than in a very small number of positions, depending on the values of M and N. It is therefore necessary to remove the cap and plastically deform it, and then to re-engage the screw and the nut.

Furthermore, the number of positions of the cap allowing it to be engaged on the fastener must be limited only to increase the possibility of loosening the fastener.

Another drawback of the described fastener is that it can only be used a limited number of times, about two or three, due to the swaging of the cap into the groove of the nut, and disassembly by a hub breaker that necessarily damages the cap.

SUMMARY OF THE INVENTION

The invention proposes to solve the problems of the prior art.

The invention relates to a cap for receiving a pin for positively locking a fastener, said fastener comprising:
   a screw, said screw extending along a longitudinal axis and comprising a threaded portion having:
      a blind hole extending along said longitudinal axis, said blind hole having an inner wall comprising at least a first anti-rotation element;
      a groove located proximate a free end of said threaded portion;
   a nut having a substantially tubular tightening portion having an angular period w, an outer wall of said tightening portion comprising means for driving the nut in rotation;
   said cap extending along a main axis substantially coincident with the longitudinal axis when in place, said cap being characterized in that it comprises:
      a substantially tubular blocking portion having an inner wall adapted to allow the insertion of the tightening portion into said blocking portion and, when said tightening portion is inserted into said blocking portion, allowing relative rotational movement of said nut with respect to said blocking portion, about the longitudinal axis, of angular amplitude φ;
      a locking portion having:
         a lug intended to be inserted into the blind hole, the lug extending along the main axis and comprising at least a second anti-rotation element, arranged on an outer surface of the lug, the second anti-rotation element being intended to cooperate with at least the first anti-rotation element of the blind hole to form a sliding connection;
         apertures adapted to receive the pin;
         at least one of the first and second anti-rotation elements of said blind hole and of said lug having an angular period θ; β, such that one of the first and second anti-rotation elements of the blind hole and of the lug respectively comprises 360/θ or 360/β grooves, and the other at least one tooth,
      and the angular amplitude φ is at least equal to:
         at the angular period θ; β if only one of the two elements has an angular periodicity;
         at the minimum of the two angular periods θ; β if the two elements have an angular periodicity;
      and said blocking portions and locking portion being secured and fixed to one another.

In one embodiment, the angular period θ; β if only one of the two anti-rotation elements has an angular periodicity, or the minimum of the two angular periods θ; β if the two anti-rotation elements have an angular periodicity, is equal to ω/p, p being a natural number greater than or equal to 2.

In one embodiment, the lug is integral with at least one support element secured to the rest of the locking portion.

In one embodiment, the at least one support member is a plate closing a free end of the locking portion.

In one embodiment, the apertures are notches.

In one embodiment, the apertures are oblong holes.

The invention also relates to a positive locking fastener comprising:
   a screw, said screw extending along a longitudinal axis and comprising a threaded portion having:
      a blind hole extending along said longitudinal axis, said blind hole having an inner wall comprising at least a first anti-rotation element, said at least one first anti-rotation element having an angular period θ about said longitudinal axis on the inner wall;
      a groove located near a free end of said threaded portion;

a nut having a substantially tubular tightening portion, an outer wall of said tightening portion comprising means for driving the nut in rotation;

said fastener being characterized in that it further comprises:
  a cap according to any one of the embodiments of the invention, the lug of which cooperates with the blind hole to immobilize said cap in rotation relative to the screw;
  a pin adapted to be inserted into the groove of the screw and into the openings of the cap so as to maintain between them said screw and said cap.

In one embodiment:
  the nut is a twelve-sided nut of which the star-shaped polygonal section has an angular period ω equal to 30°;
  a cross-section of the inner wall of the blind hole is a star-shaped polygonal cross-section of angular period θ equal to 15°,
  the lug of the cap comprises twelve teeth, the cross-section of which has an angular period equal to 30°.

In one embodiment, the pin is a cotter pin.

BRIEF DESCRIPTION OF THE FIGURES

The invention will be better understood on reading the following description and examining the accompanying figures. These are presented only by way of non-limiting indication of the invention.

FIG. 1b shows an isometric view with cross-section along a longitudinal plane of the positive locking fastener in the embodiment of FIG. 1a.

FIG. 2a shows an isometric view of a part of the threaded portion of the screw of the fastener in the embodiment of FIG. 1a.

The figures are schematic diagrams proposed for a good understanding of the invention and are not necessarily scaled.

DETAILED DESCRIPTION

Throughout the description, the angles are expressed in degrees.

Figure 1A:
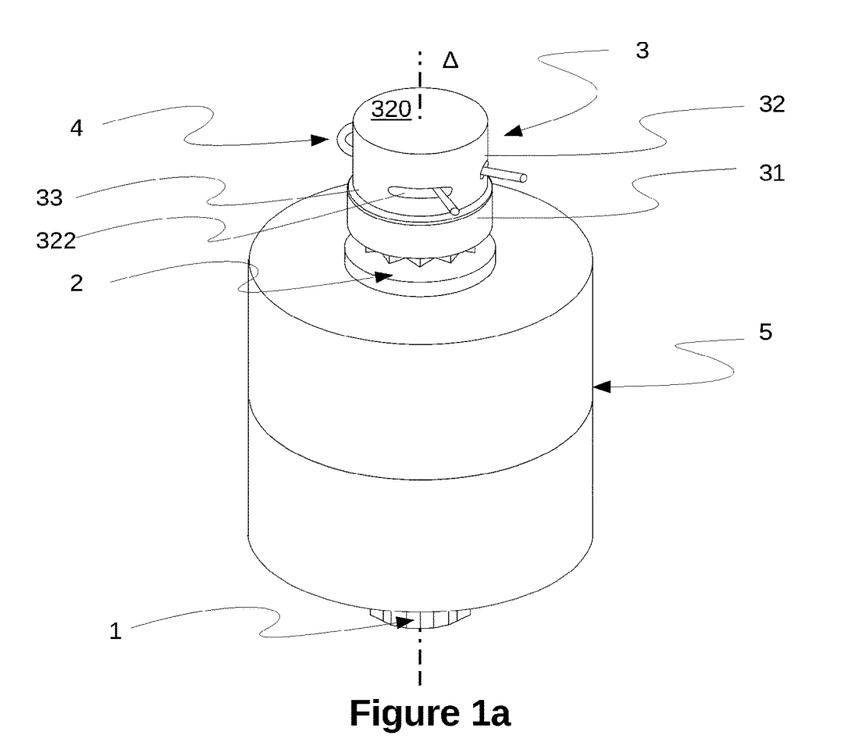
FIG. 1a shows an isometric view of a positive locking fastener according to the invention, holding a structural assembly, in an exemplary embodiment of the invention.
Figure 1B:
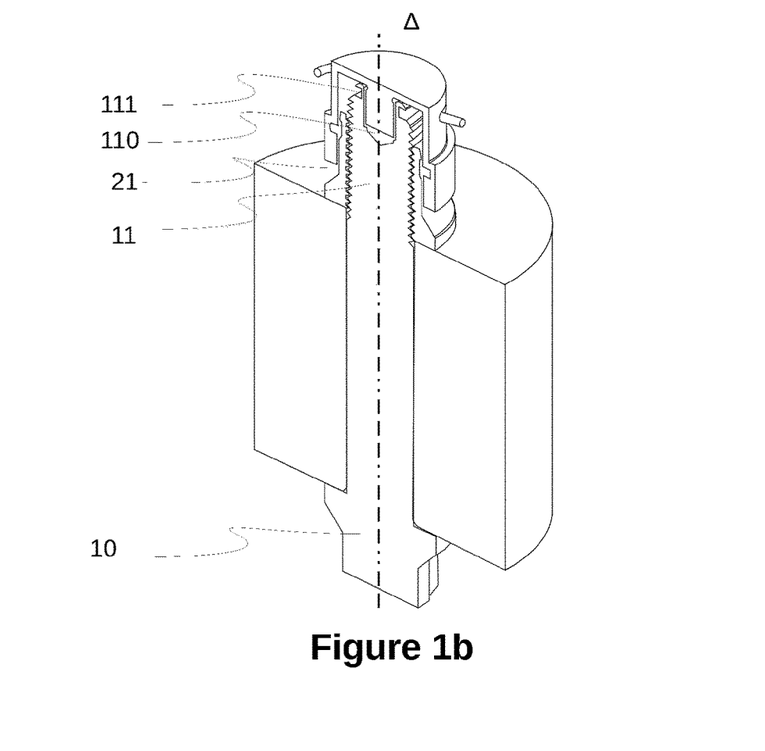

With reference to FIGS. 1a and 1b, a positive locking fastener according to the invention comprises:
  a fastener comprising a screw 1 and a nut 2 for holding together two structural elements forming a structural assembly 5;
  a cap 3;
  a pin 4.

Figure 2A:
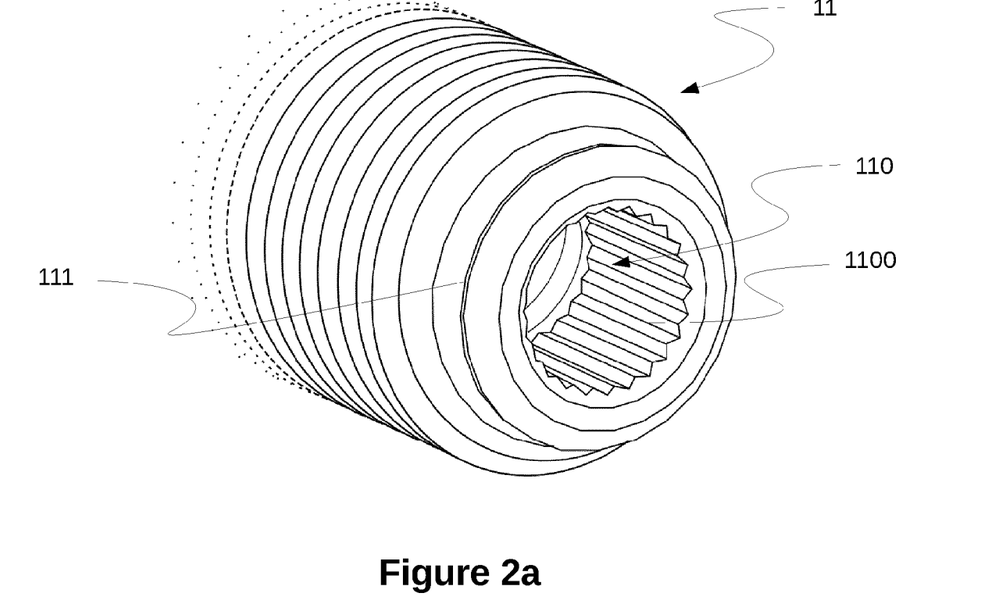
Figure 2B:
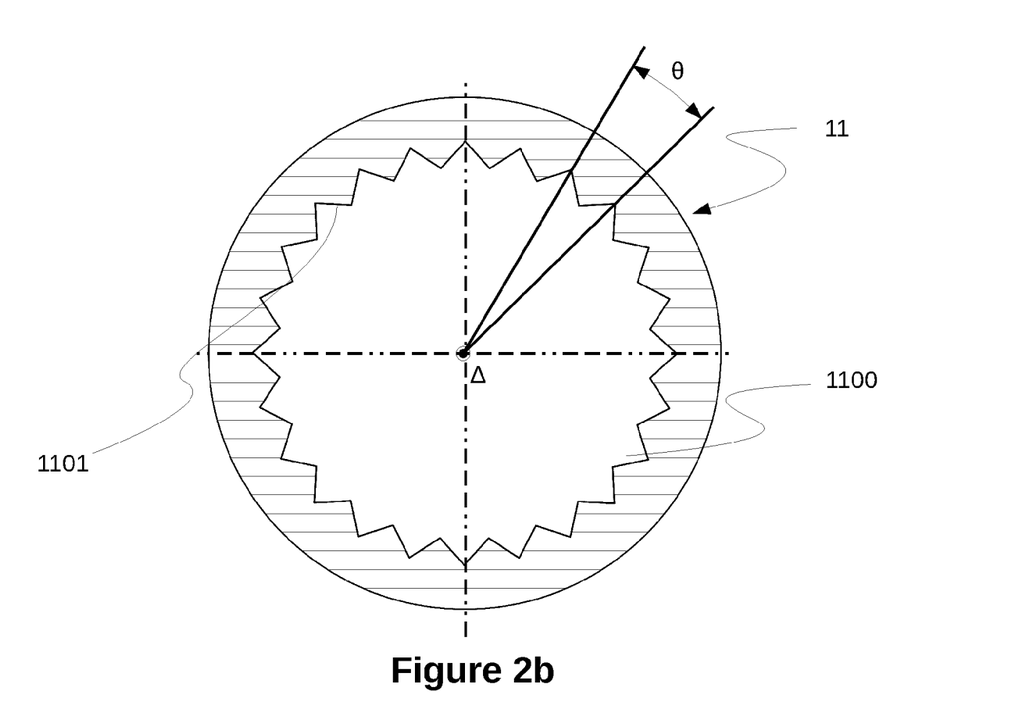
FIG. 2b shows a cross-sectional view of the screw in the embodiment of FIG. 1a (thread of the screw not shown).

The screw 1 extends along a longitudinal axis Δ and has at a first end a head 10 and at a second end a threaded portion 11. The threaded portion 11 has a cavity 110, which is blind in the illustrated example, extending axially and opening onto the second end. In the example illustrated in FIGS. 2a and 2b, the cavity 110 has a substantially cylindrical shape with a star-shaped polygonal cross-section forming a set of grooves 1100 and teeth 1101 forming a first anti-rotation element. In the example illustrated, the cavity 110 has an angular period θ about the axis Δ equal to 15°, that is to say that the cavity has twenty-four teeth 1101 and twenty-four grooves 1100. Near the second end, the threaded portion also comprises a groove 111 with a U-shaped cross-section.

Figure 3A:
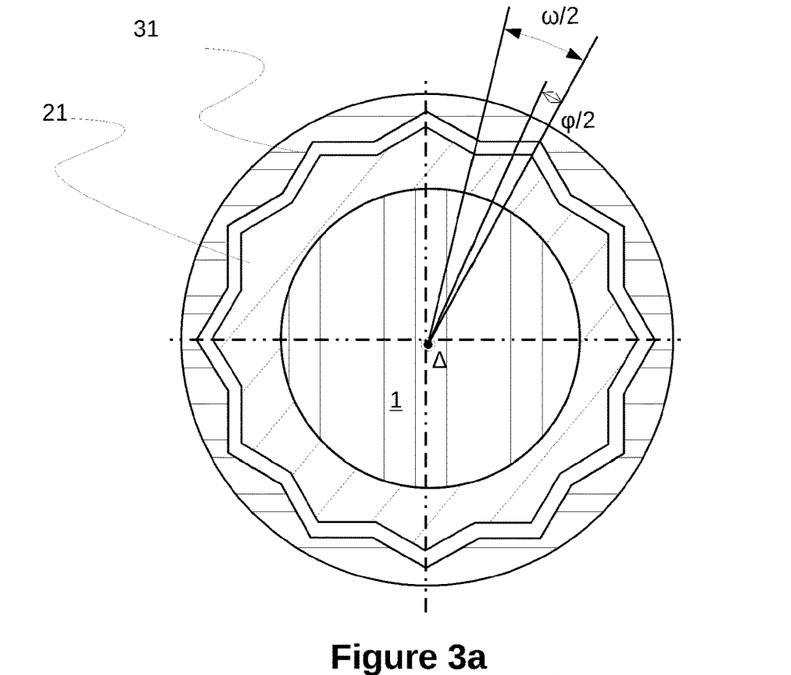
FIG. 3a shows a cross-sectional view of the fastener in a first configuration, when the cap is installed on the fastener, said section being made at the blocking portion of the cap (screw thread of the screw not shown).
Figure 3B:
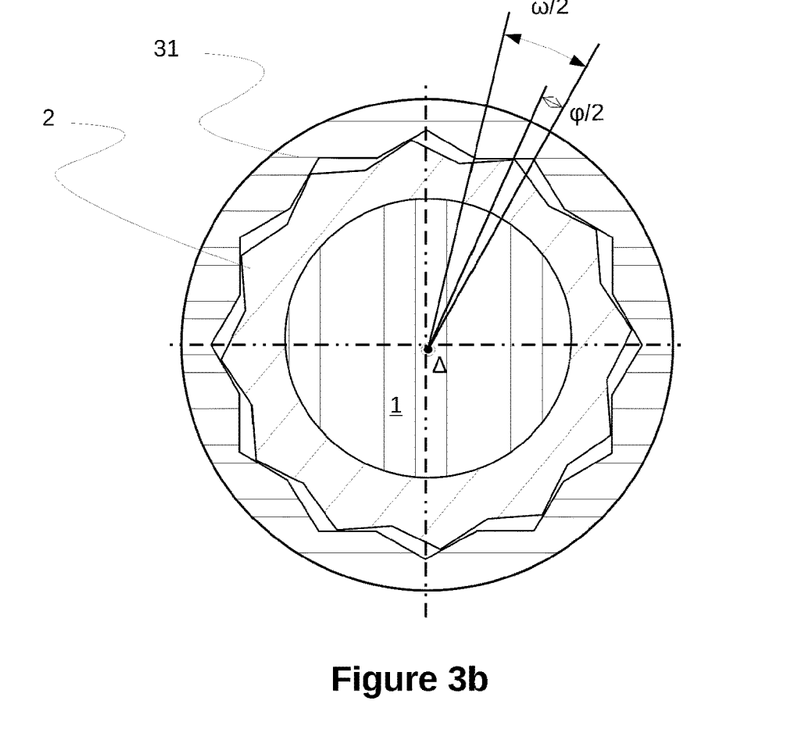
FIG. 3b shows a cross-sectional view of the fastener in a second configuration, when the cap is installed on the fastener, said section being made at the blocking portion of the cap (screw thread of the screw not shown).

With reference to FIGS. 3a and 3b, the nut 2 has a substantially tubular tightening portion 21 and extending along the longitudinal axis Δ when the nut 2 is installed on the screw 1. An inner wall of the nut 2 is threaded to be screwed onto the threaded portion 11 of the screw 1. An outer wall of the tightening portion 21 has a substantially cylindrical shape with a star-shaped polygonal cross-section, of angular period w about the longitudinal axis Δ. In the example illustrated, the nut 2 is a twelve-sided nut. The tightening portion 21 thus has an angular period w about the longitudinal axis Δ equal to 30°.

With reference to FIGS. 1a, 1b, 4a and 4b, the cap 3 is an element extending along a main axis Δ1 substantially coincident with the axis Δ when the fastener is installed, and comprising a blocking portion 31 and a locking portion 32 secured and fixed together, optionally connected to each other by means of a frustoconical connection portion 33 as illustrated in the figures. The shape of the illustrated connecting portion 33 is not limiting, it can be realized in various forms.

Figure 4A:
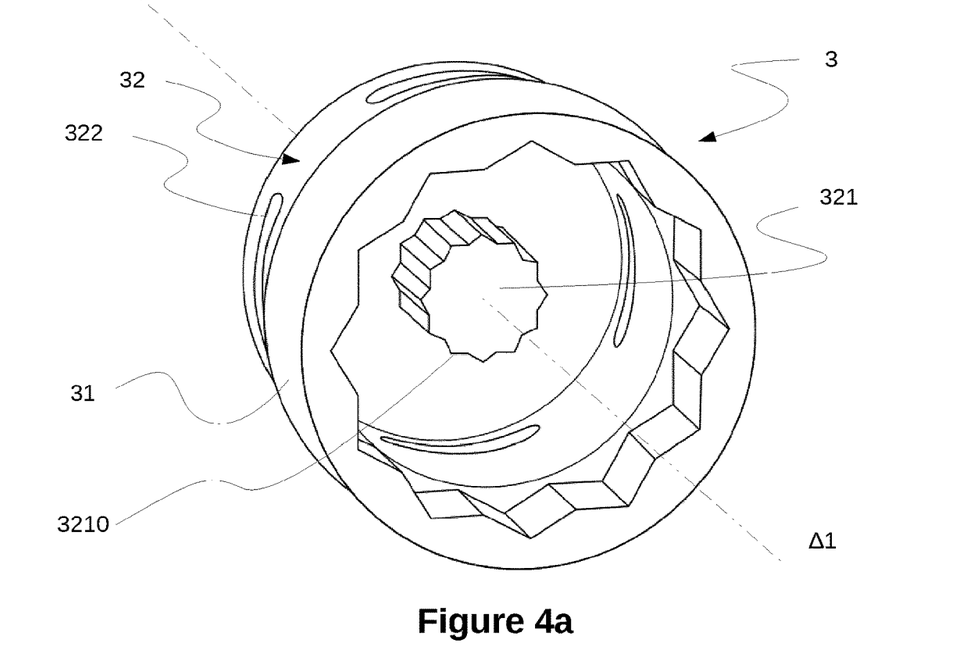
FIG. 4a shows an isometric view of the cap in the embodiment of FIG. 1a of the fastener.
Figure 4B:
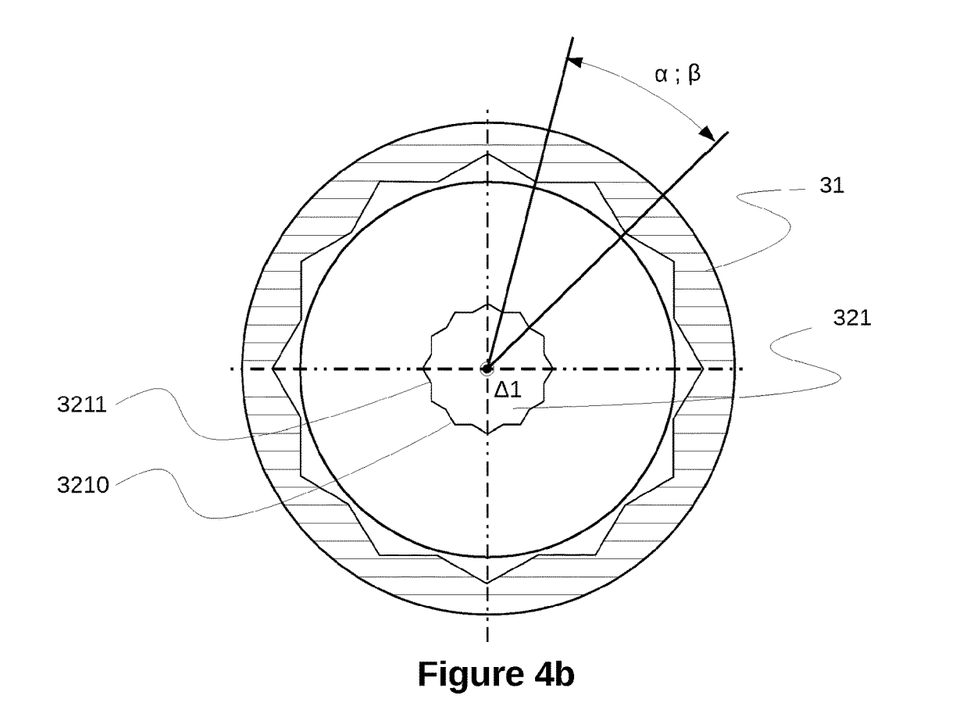
FIG. 4b shows a cross-sectional view, at the blocking portion, of the cap in the embodiment of FIG. 1a of the fastener.

The blocking portion 31 is a tubular element of which an outer wall is cylindrical, having a main axis Δ1, of circular cross-section, and an inner wall is cylindrical, coaxial with the main axis Δ1, of star-shaped polygonal cross-section. An angular period α of the inner wall is substantially equal to the angular period w of the outer wall of the tightening portion 21 of the nut 2. In the example illustrated, the angular period α of the inner wall about the axis Δ1 is equal to 30°. The dimensions of the blocking portion 31 are selected such that the tightening portion 21 can be inserted at least partially into said blocking portion with a mounting clearance and furthermore allowing an angular displacement ω of said blocking portion about its axis equal to the angular period θ, ie 15°.

Alternatively, the number of teeth 1101 and grooves 1100 of the cavity 110 could be greater, for example equal to forty-eight. The angular period θ would therefore be 7.5°, and the angular displacement φ of the blocking portion 31 of the cap 3 relative to the tightening portion of the nut 2 would also be 7.5°. On the contrary, the number of teeth 1101 and the grooves 1100 of the cavity could be less, for example equal to twelve. The angular period would therefore be 30°, and the angular displacement ω of the locking portion 31 relative to the tightening portion of the nut 2 would also be 30°.

In the case of a small number of teeth 1101 and consequently of a large angular displacement ω, the positive locking function would always be carried out, but the mechanical strength of the cap would be less. In the case of a very large number of teeth 1100 and a small angular displacement ω, the mechanical strength would be markedly increased, but the production costs of the screw would increase due to the precision required to make the large number of grooves 1100 and teeth 1101.

The locking portion 32 is a substantially tubular hollow body extending along the main axis Δ1, said locking portion being connected to the blocking portion 31 by a first end, and closed at a second end by a plate 320.

The locking portion 32 also comprises a lug 321 of a shape complementary to that of the cavity 110. In the example illustrated in FIG. 4a, the lug 321 has a cylindrical shape with a star-shaped polygonal cross-section forming a set of teeth 3210 and grooves 3211, forming a second anti-rotation element. The lug 321 is connected to a support element. In the embodiment illustrated in FIG. 4a, the support element is the plate 320 and the lug 321 extends from an inner wall of the plate 320 in a direction along the main axis Δ1. An angular period β of the lug 321 around the axis Δ1 separates the teeth 3210. In the example illustrated, the angular period β is equal to 30°, which means that the lug comprises twelve teeth 3210 and twelve grooves 3211.

Alternatively, the number of teeth 3210 of the lug 321 could be at least equal to one tooth and at most equal to the maximum number of grooves of the cavity, so that the lug can be always inserted into the cavity 110.

Figure 8:
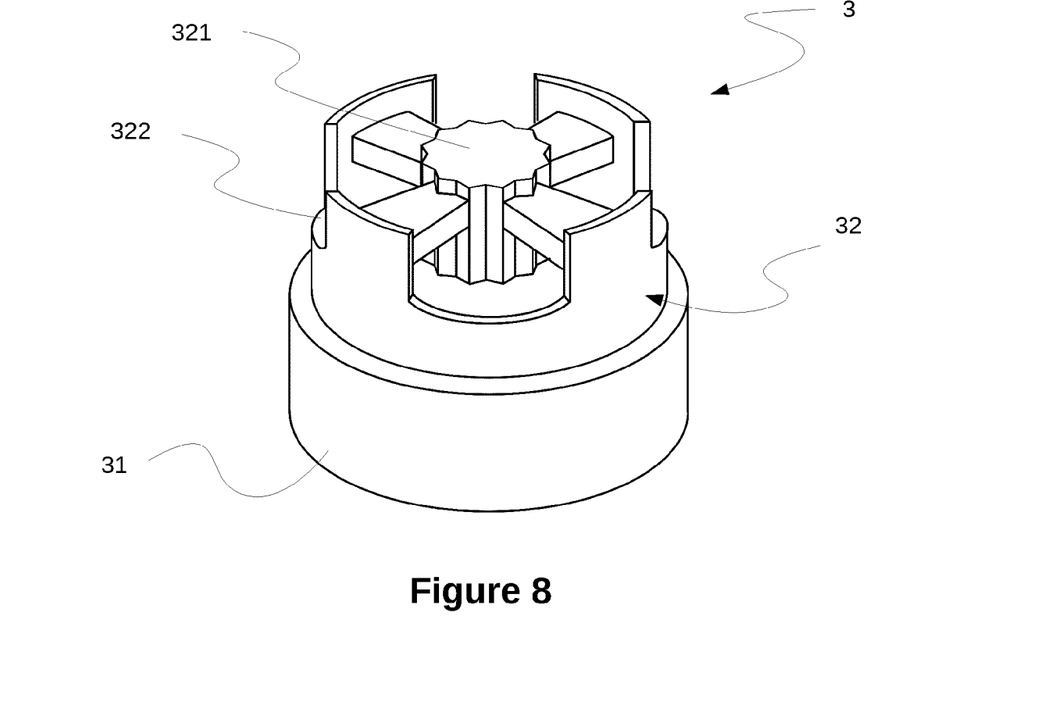
FIG. 8 shows an isometric view of the cap in an embodiment in which the openings are notches and the support element is a set of support arms.

The locking portion 32 also includes a set of openings 322, for example holes or notches. In the example illustrated in FIG. 4a, the openings 322 are oblong holes, a median plane intersecting said openings in the direction of their length is substantially perpendicular to the main axis Δ1 of said first cap. The dimensions of the openings 322 are adapted to allow the insertion of the pin 4 into said openings. In the example illustrated in FIG. 8, the openings 322 are notches.

The blocking portion 31 and the locking portion 32 can also have a same outer diameter, so that the connecting portion can have a same outer diameter as said blocking and locking portions. The cap 3 may also present on at least one of the outer walls of the blocking portion 31, locking portion 32 and/or connecting portion 33 of the portions facilitating the gripping of the cap, such as recesses with respect to the cylindrical wall, or projections.

The fastener according to the invention is carried out in the manner described below.

Firstly, the nut 2 is installed on the screw 1 to hold the structural assembly 5 with the tightening to the desired torque.

Subsequently, the blocking portion 31 of the cap 3 is aligned with the tightening portion 21 of the nut 2 such that said blocking portion can be partially slid onto said tightening portion.

Then, if the lug 321 does not enter the cavity 110, a rotation of the cap 3 about the main axis Δ1 is carried out so that said stud can enter said cavity.

The angular displacement ω of the blocking portion 31 with respect to the tightening portion 21 is equal to θ, such that the lug 321 can be inserted into the cavity 110 by rotation of the cap 3 on the left or right without requiring the disengagement of said cap from the nut 2.

The cavity 110 having two times more grooves 1100 than the lug 321 has teeth 3210, the possible number of positions in which the cap 3 is put in place correctly without further rotation on the nut is maximized. In this example, the cavity has twenty-four grooves, there is therefore twenty-four positions in which the cap 3 is put in place correctly without further rotation on the nut.

Alternatively, the numbers of teeth 3210 of the stud and grooves 1100 of the cavity may be equal, without impact on the mechanical strength of the cap.

Thus, it is possible to tighten the nut 2 at the nominal tightening torque on the screw 1 and then to place the cap 3 which will hold the nut 2 in position in the limit of loosening of the angular clearances.

Figure 5:
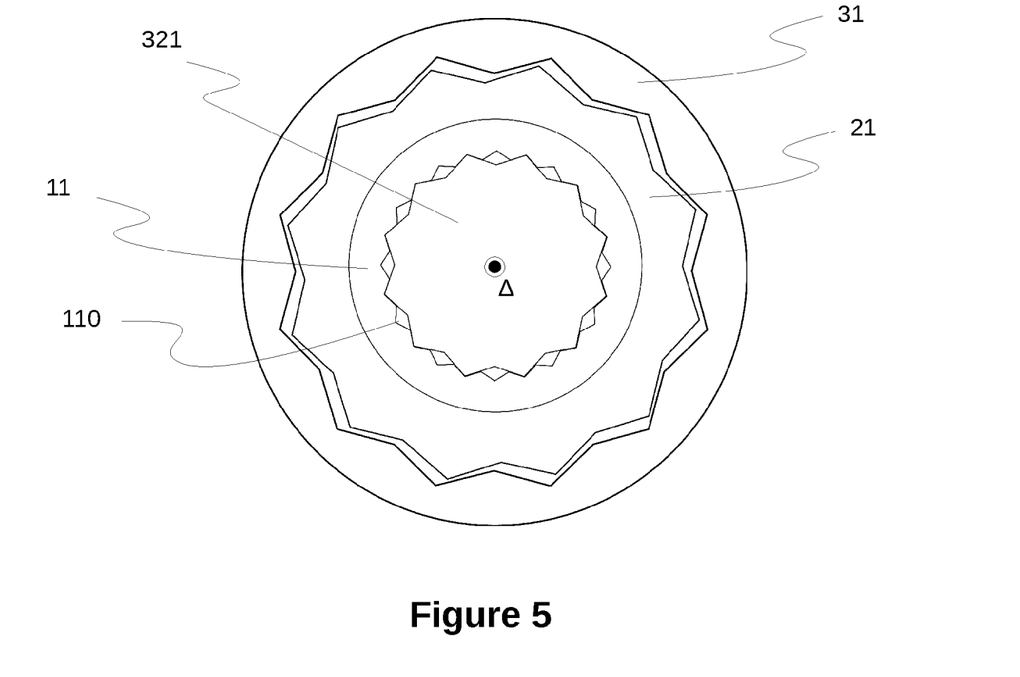
FIG. 5 is a schematic illustration representing the relative positions of the threaded portion, the tightening portion, the lug and the locking portion, in a position of the cap allowing its engagement on the fastener.

FIG. 5 represents a schematic illustration of the relative positions of the screw 1, of the nut 2, of the blocking portion 31 and of the lug 321 after installing the cap 3.

Once the cap 3 is placed, the pin 4, such as a cotter pin, is inserted into the openings 322 and is inserted into the groove 111 of the threaded portion 11, thus making it possible to block the cap 3 on the screw and the nut and lock the fastener.

Figure 6:
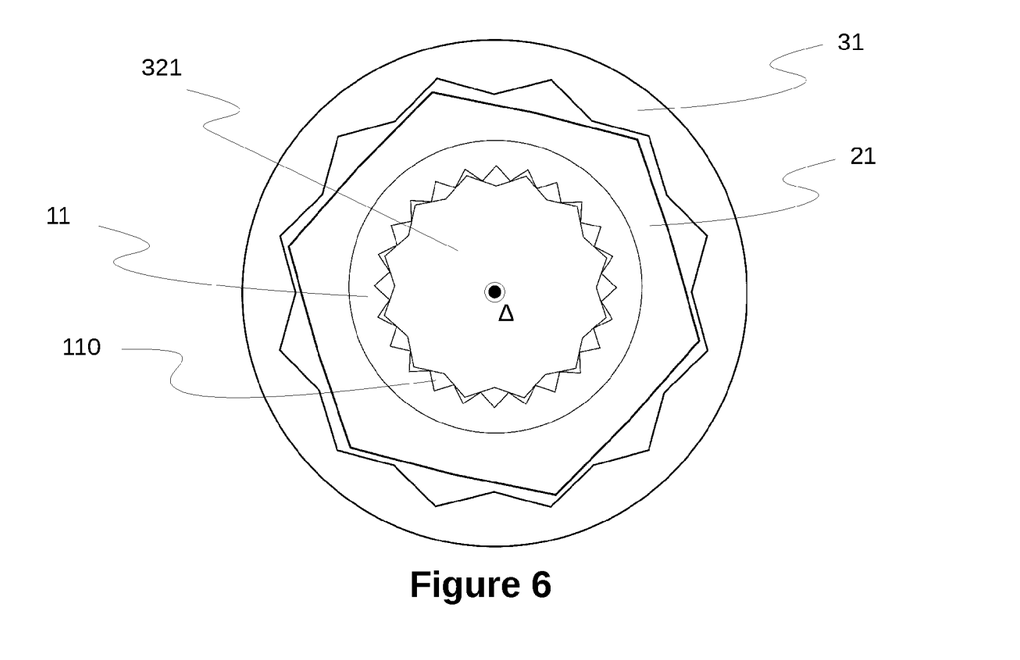
FIG. 6 represents a schematic illustration representing the relative positions of the threaded portion, of the tightening portion, of the lug and of the blocking portion, in a position of the cap allowing its engagement on the fastener, in a variant embodiment in which the nut is a six-sided nut.
Figure 7:
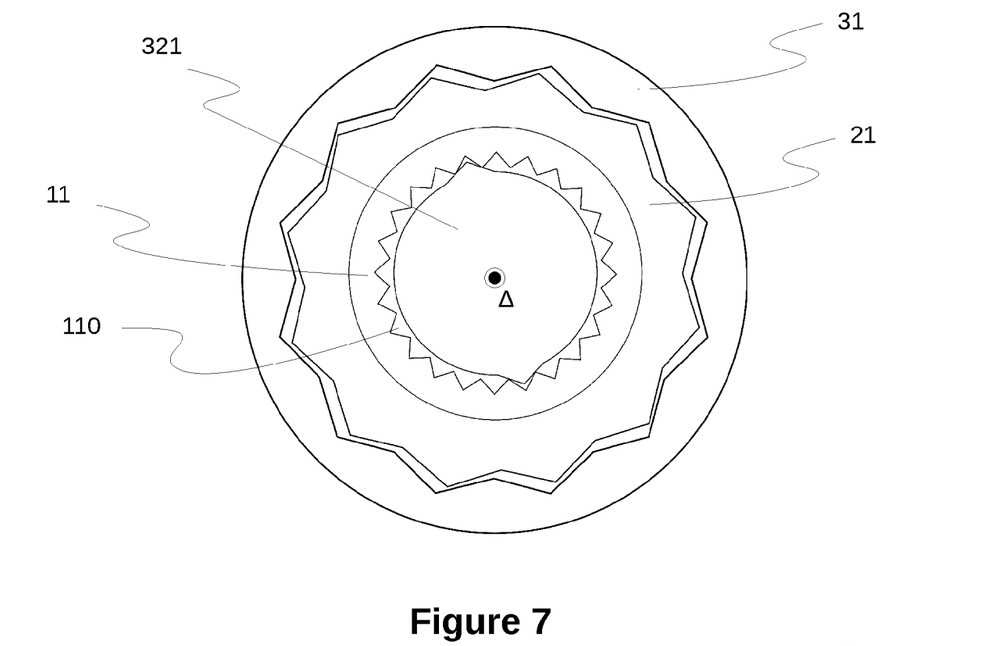
FIG. 7 represents a schematic illustration representing the relative positions of the threaded portion, of the tightening portion, of the lug and of the blocking portion, in a position of the cap allowing its engagement on the fastener, in a variant embodiment in which the lug has two diametrically opposed teeth.

In addition, it should be noted that:
the rotation of the cap 3 after partial positioning on the nut 2 can be carried out both in a clockwise and counter-clockwise direction about the longitudinal axis Δ;
the cap 3 can be placed whatever the orientation of the nut 2 with respect to the screw 1, regardless of the orientation of the star-shaped polygonal section of the lug 321 with respect to the star-shaped polygonal section of the inner wall of the blocking portion 31;
the angular periods ω and α of the tightening portion 21 and of the blocking portion 31 are not necessarily equal to one another. The cap 3 described above is, for example, adapted to a hexagon nut, as illustrated in FIG. 6. In general, the angular period α is equal to an integer multiple of said angular period θ of said cavity;
the function of the lug 321 being to block the rotation of the cap 3 relative to the screw 1, it is sufficient for the lug 321 and the screw 1 to have any relative angular position with an angular pitch θ, for example that one of the screw 1 and the lug 321 comprises 360/θ grooves and the other at least one tooth, to enable said blocking. Since the lug 321 has at least two teeth 3210, each of said teeth is to be separated from another tooth by an integer multiple angle of θ. Preferably, in order to ensure a mechanical strength of the attachment, the lug 321 comprises at least two teeth 3210, as illustrated in FIG. 7;
unlike the example presented, the lug 321 may alternatively comprise a number of grooves 3211 greater than the number of teeth 1101 of the cavity 110. In this case, the angular displacement ω of the blocking portion 31 with respect to the tightening portion 21 is calculated as a function of the number of teeth and grooves of the stud, or in other words, depending on the period β of the anti-rotation means lug, period less than the period θ of the anti-rotation means of the cavity 110.

An advantage of the invention is that it allows positive locking of the fastener regardless of the relative position of the nut 2 with respect to the screw 1 after application of the tightening torque of the nut 2 during its installation by ensuring at least one position of the cap allowing it to be put in place and by limiting the loosening angle to a maximum acceptable value. In practice, due to clearances existing between its various elements, due to tolerances, the fastening according to the invention has, in the embodiment shown in FIGS. 1 to 5, a maximum loosening of approximately 10°, with all combined forces. This maximum release corresponds to a maximum preload loss of approximately 5%. The term "maximum preload loss" is understood to mean the loss of preload in the most pessimistic scenario of loosening of the fastener, taking into account the maximum possible rotation according to the principles discussed plus the mechanical clearance compensation.

Although it is particularly suitable for a twelve-sided nut, a person skilled in the art will understand that the invention is not limited to the illustrated embodiment, and can be applied in particular to other nuts. However, it should be noted that the chosen configuration will always have to meet that the maximum loosening angle does not lead to a decrease in the preload greater than a specified value. By way of example, in one embodiment using a six-sided nut and a cap having a locking portion of the same angular period as the tightening portion of the nut, ie 60°, the maximum loosening is approximately 20°, since the angular displacement of the nut 2 in the cap 3 doubles. This leads to a maximum preload loss of about 10%. In order to limit the maximum preload loss in this case, one solution is to keep the blocking portion 31 of the cap 3 determined in the case of a twelve-sided nut, as illustrated in FIG. 6, such that the angular displacement of the nut in the second cap is 15° instead of 30°.

The invention claimed is:

1. Cap intended to receive a pin to provide positive locking of a fastener, said fastener comprising:
   a screw, said screw extending along a longitudinal axis (Δ) and comprising a threaded portion having:
      a blind hole extending along said longitudinal axis, said blind hole having an inner wall comprising at least a first anti-rotation element;
      a groove located near a free end of said threaded portion;
   a nut having a substantially tubular tightening portion having an angular period ω, an outer wall of said tightening portion comprising means for driving the nut in rotation;
   said cap extending along a main axis (Δ1) substantially coincident with the longitudinal axis (Δ) when in place, said cap being characterized in that it comprises:
   a substantially tubular blocking portion having an inner wall adapted to allow the insertion of the tightening portion into said blocking portion and, when said tightening portion is inserted into said blocking portion, allow a relative rotational movement of said nut with respect to said blocking portion, about the longitudinal axis (Δ), of angular amplitude φ;
   a locking portion having:
      a lug intended to be inserted into the blind hole, the lug extending along the main axis (Δ1) and comprising at least a second anti-rotation element, arranged on an outer surface of the lug, the second anti-rotation element being intended to cooperate with at least the first anti-rotation element of the blind hole to form a sliding connection;
      openings adapted to receive the pin;
   at least one of the first and second anti-rotation elements of said blind hole and of said lug having an angular period θ; β, such that one of the first and second anti-rotation elements of the blind hole and of the lug respectively comprises 360/θ or 360/β grooves, and the other at least one tooth,
   and the angular amplitude φ is at least equal to:
      the angular period θ; β if only one of the first and second anti-rotation elements has an angular periodicity;
      a smallest of the two angular periods θ; β if both of the first and second anti-rotation elements have an angular periodicity;
   and said blocking portions and locking portion being secured and fixed to one another.

2. The cap according to claim 1, wherein the angular period θ; β if only one of the two anti-rotation elements has an angular periodicity, or the minimum of the two angular periods θ; β if the two anti-rotation elements have an angular periodicity, is equal to ω/p, p being a natural number greater than or equal to 2.

3. The cap of claim 2 wherein the first anti-rotation element has a plurality of grooves and the second anti-rotation element has teeth and the first anti-rotation element has no more than twice as many grooves as a number of teeth in the second anti-rotation element.

4. The cap of claim 3 wherein the first anti-rotation element has the same number of grooves as the number of teeth in the second anti-rotation element.

5. The cap of claim 3 wherein the second anti-rotation element has twenty-four teeth.

6. The cap according to claim 1, wherein the lug is secured to at least one support element secured to the rest of the locking portion.

7. The cap according to claim 6, characterised in that the at least one support element is a plate closing a free end of the locking portion.

8. The cap according to claim 1, wherein the openings are notches.

9. The cap according to claim 1, wherein the openings are oblong holes.

10. Positive locking fastener comprising:
    a screw, said screw extending along a longitudinal axis (Δ) and comprising a threaded portion having:
       a blind hole extending along said longitudinal axis, said blind hole having an inner wall comprising at least a first anti-rotation element, said at least one first anti-rotation element having an angular period θ about said longitudinal axis on the inner wall;
       a groove located near a free end of said threaded portion;
    a nut having a substantially tubular tightening portion, an outer wall of said tightening portion comprising means for driving the nut in rotation;
    said fastener being characterized in that it further comprises:
    a cap according to claim 1, the lug of which cooperates with the blind hole in order to immobilize said cap in rotation relative to the screw;
    a pin adapted to be inserted into the groove of the screw and into the openings of the cap so as to maintain between them said screw and said cap.

11. The fastener according to claim 10, characterised in that:
    the nut is a twelve-sided nut of which the star-shaped polygonal section has an angular period ω equal to 30°;

a cross-section of the inner wall of the blind hole is a star-shaped polygonal cross-section of angular period θ equal to 15°, the lug of the cap comprises twelve teeth, the cross-section of which has an angular period equal to 30°.

12. The fastener according to claim 10, characterised in that said pin is a cotter pin.

* * * * *